March 3, 1964  J. M. BROWNLOW  3,123,748
FERRITE COMPOSITION
Filed Dec. 1, 1961

INVENTOR
JAMES M. BROWNLOW
BY
ATTORNEY

United States Patent Office 3,123,748
Patented Mar. 3, 1964

3,123,748
FERRITE COMPOSITION
James M. Brownlow, Crompond, N.Y., assignor to International Business Machines Corporation, New York, N.Y., a corporation of New York
Filed Dec. 1, 1961, Ser. No. 156,232
10 Claims. (Cl. 317—158)

This invention relates to a ferrite ceramic composition which is magnetic and possesses a square or rectangular hysteresis loop. More particularly, it relates to a new chemical system of ferrite ceramics, suitable for use in computer mechanisms, containing oxides of $Fe^{3+}$, $Cu^{2+}$, $Ni^{2+}$, $Ti^{4+}$, $Cr^{3+}$, and $Zn^{2+}$.

It is well known in the art that square loop type ferrites can be prepared by mixing certain oxides and firing them to high temperatures to obtain thereby a reaction product which has the cubic spinel structure. It is usually the case that the form of the parts used in computer mechanisms is that of a small toroid or a plate with many apertures. When these parts are to be employed as storage elements in a magnetic memory array the electrical conductors that pass through the apertures of the toroids or plate are put in place after the firing process is completed.

A method of making magnetic memory arrays in which the ferrite is formed on the array of electrical conductors of platinum or platinum-rhodium alloys before firing has been disclosed in U.S. Patent 2,981,932 to Looney et al. The advantages of this method reside in the elimination of the wiring step necessary in other older methods. Thus the conductors are now in place after firing and need only be soldered to a frame to complete the construction of a magnetic memory plane.

In the Looney et al. method, it was found that the Pt or Pt-Rh alloys would give satisfactory results with commercial ferrite compositions. Other metals such as copper or copper containing alloys would melt or react chemically with these commercial ferrite compositions because of the high firing temperatures (1200–1400° C.) required to obtain desirable magnetic properties. Since it was highly desired for reasons of economy and of better electrical conductivity to prepare composite devices with copper or copper containing alloys as the conductor, it was necessary to search for new ferrite compositions which would fire at low temperatures 800°–1050° C. (below the melting point of copper 1080° C.) and still possess the desirable properties of low coercive force and fast switching speed.

The present ferrite ceramic composition system has been found to have the properties necessary for operation as a memory storage element when fired at relatively low maturing (or firing) temperatures.

A ferrite ceramic composition is defined and understood by those skilled in the art to be a material with a cubic spinel structure which results from the heating or firing and complete reaction of the component oxides used in preparing the ferrite composition.

An object of this invention is to provide square loop ferrite ceramic compositions which mature at low firing temperatures.

A further object is to provide a ferrite ceramic composition which can be fired in contact with inexpensive copper containing alloy conductors.

Still another object of this invention is to provide a ferrite ceramic composition containing oxides of $Fe^{3+}$, $Cu^{2+}$, $Ni^{2+}$, $Ti^{4+}$, $Cr^{3+}$, and $Zn^{2+}$.

The foregoing and other objects, features and advantages of the invention will be apparent from the following more particular description of preferred embodiments of the invention, as illustrated in the accompanying drawings.

A preferred manner of preparing the ferrites of the present invention is the following: the initial mixture of component oxides (see examples in Table I) is mixed thoroughly in a ball mill for 4 hours. It is then dried and calcined at 750° C. for 1 hour. The calcined mixture is subsequently ground in a ball mill for 4 hours with water and 3% polyvinyl alcohol as a binder and lubricant. The mill charge is dried to a powder suitable for pressing and compacted in a steel die at a pressure sufficient to form a coherent body, usually greater than 40,000 lbs. in². The body is then fired at the temperature and time as set forth in Table I for the appropriate formula number.

TABLE I

*Weights of Initial Oxides and Firing Treatment*

| Formula Number | Weight in Grams | | | | | | Firing Treatment | |
|---|---|---|---|---|---|---|---|---|
| | $Fe_2O_3$ | CuO | NiO | $TiO_2$ | $Cr_2O_3$ | ZnO | Temp., °C. | Time, Hrs. |
| G-11 | 140 | 39.77 | 7.46 | 11.98 | | 40.68 | 980 | 0.5 |
| G-12 | 120 | 39.77 | 7.46 | 15.98 | 11.4 | 44.75 | 950 | 0.1 |
| G-13 | 140 | 39.77 | 14.94 | 12 | | 32.42 | 800 | 16.0 |
| G-14 | 140 | 39.77 | 22.4 | 12 | | 24.42 | 950 | 16.0 |
| G-15 | 120 | 47.7 | 22.4 | 15.98 | | 32.5 | 1,050 | 2.0 |
| G-18 | 168 | 47.7 | 22.4 | | | | 1,050 | 16.0 |
| G-19 | 168 | 59.65 | 11.2 | | | | 1,050 | 16.0 |
| G-21 | 140 | 59.65 | 22.4 | 15.98 | | | 950 | 1.0 |
| G-22 | 156 | 47.7 | 22.4 | | 11.4 | | 950 | 16.0 |
| G-23 | 168 | 39.77 | 7.46 | | | 24.42 | 950 | 1.0 |
| G-24 | 140 | 51.7 | 22.4 | 11.98 | 11.4 | | 950 | 8.0 |
| G-25 | 140 | 39.77 | 22.4 | 11.98 | | 24.42 | 950 | 1.0 |
| G-26 | 148 | 39.77 | 14.94 | | 11.4 | 24.42 | 950 | 8.0 |

It has been found that these ferrite formulations can be fired at low firing temperatures in contact with inexpensive good electrical conductors such as copper or a copper containing alloys (e.g. Cu-Ni, Cu-Ni-Cr, etc.) and not suffer loss of magnetic switching properties.

Figure 1:
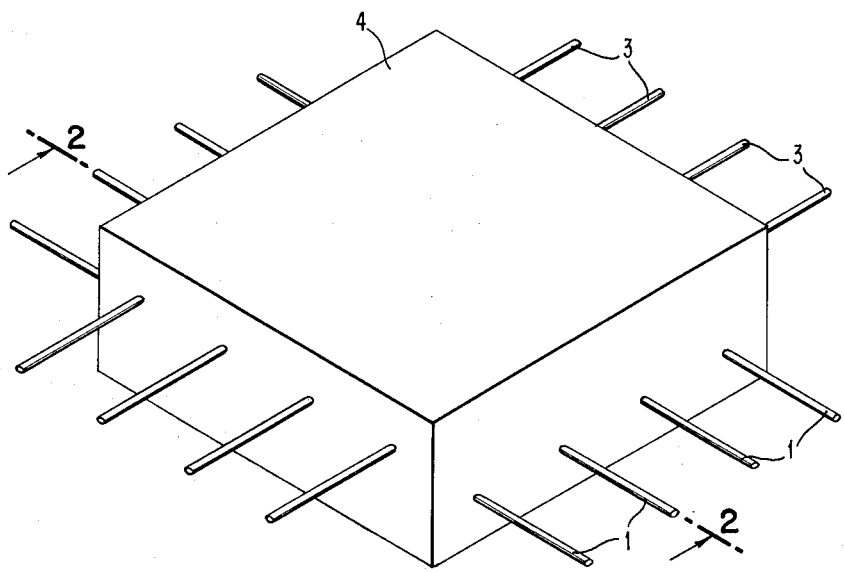
FIGURE 1 is a perspective view of a composite device of the present invention.

In FIGURE 1, a first plurality of spaced parallel copper containing metal conductors 1 (e.g. wires) passes through a block of a ferrite ceramic composition 4 in a first plane and a second plurality of spaced parallel copper containing conductors 3 (e.g. wires) passes through the block of ferrite ceramic composition 4 in a second plane. The first and second planes in which the first and second plurality lie respectively are preferably parallel to each other and separated by a small distance of the order of .050 inch. Although in FIGURE 1 there is shown a rectangular block, it should be understood that the block may take any suitable geometric form provided the ferrite ceramic composition is disposed between the first and second plurality of wires.

Figure 2:
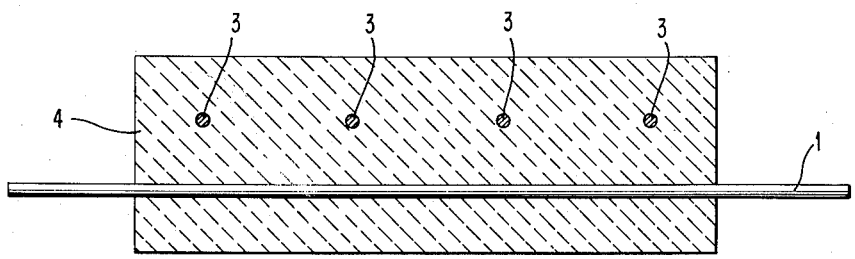
FIGURE 2 is a sectional view taken through line 2—2 of FIGURE 1.

In FIGURE 2, there is shown a cross section of the composite device illustrated in FIGURE 1 taken along the line 2—2. FIGURE 2 clearly shows the spacing between the first plurality and second plurality of copper containing metal conductors and also the spacing in the second plurality between the individual metal conductors thereof.

This structure in FIGURE 1 is made from a calcined powder containing a binder prepared as described above and in Table I by pressing a thin layer (e.g. 0.10 inch thick) of the calcined powder in a specialized rectangular steel die. One set of copper containing conductors 1 comprising the first plurality is placed over this layer and a second layer (e.g. 0.60 inch thick) of calcined powder pressed thereon. A second set of copper containing conductors 3 comprising the second plurality is placed in the die oriented with respect to the first plurality of conductors at some angle, for example 90°. This second plurality is covered with a third layer of calcined powder and pressed. In this arrangement the wires are insulated from each other by the compacted calcined powder. This shape is then ready to be fired at a temperature between 800° and 1050° C. to produce a cubic spinel ferrite ceramic composition.

This device has a practical use as a complete magnetic memory array for use in computer mechanisms and has the advantage of eliminating the necessity for wiring after firing.

The region of the ferrite ceramic composition near any selected cross over point between planes of the copper containing conductors can be made to assume either of two stable remanent magnetic states by means of a pulse of electric current imposed on one conductor.

Ferrite ceramic compositions prepared from oxide mixtures and subjected to the appropriate firing treatment set forth in Table I have the corresponding final ferrite ceramic composition (expressed in atom numbers) and the magnetic properties set forth in Table II.

TABLE II

*Formula in Atom Numbers of* 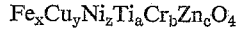 *and Magnetic Properties*

| Formula Number | Atom Numbers | | | | | | Coercive Force (Oersteds) | $B_r/B_s$ |
|---|---|---|---|---|---|---|---|---|
| | x | y | z | a | b | c | | |
| G11 | 1.75 | 0.5 | 0.1 | 0.15 | 0 | 0.5 | 0.25 | .5 |
| G12 | 1.5 | 0.5 | 0.1 | 0.2 | 0.15 | 0.55 | 0.7 | .5 |
| G13 | 1.75 | 0.5 | 0.2 | 0.15 | 0 | 0.4 | 2.0 | .7 |
| G14 | 1.75 | 0.5 | 0.3 | 0.15 | 0 | 0.3 | 0.6 | .7 |
| G15 | 1.5 | 0.6 | 0.3 | 0.2 | 0 | 0.4 | 3.0 | .5 |
| G18 | 2.1 | 0.6 | 0.3 | 0 | 0 | 0 | 2.0 | .7 |
| G19 | 2.1 | 0.75 | 0.15 | 0 | 0 | 0 | 2.6 | .9 |
| G21 | 1.75 | 0.75 | 0.3 | 0.2 | 0 | 0 | 1 | .7 |
| G22 | 1.95 | 0.6 | 0.3 | 0 | 0.15 | 0 | 2.5 | .75 |
| G23 | 2.1 | 0.5 | 0.1 | 0 | 0 | 0.3 | 1.0 | .7 |
| G24 | 1.75 | 0.65 | 0.3 | 0.15 | 0.15 | 0 | 2.1 | .8 |
| G25 | 1.75 | 0.5 | 0.3 | 0.15 | 0 | 0.3 | 1.4 | .78 |
| G26 | 1.85 | 0.5 | 0.2 | 0 | 0.15 | 0.3 | 1.9 | .8 |

Although low firing temperatures (800–1050° C.) were used in the preparation of the ferrite ceramic compositions, the values of coercive force obtained are low (0.25–3.0 oersteds), and the $B_r/B_s$ ratio within desirable limits (0.5–0.9).

In summary, the ferrite ceramic composition of the invention has the formula

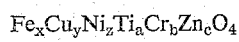

wherein $$x+y+z+a+b+c=3$$
$$2.2 \leq x+y+z \leq 3.0$$
$$0 \leq a+b+c \leq 0.8$$

and $$x=1.5\text{--}2.1$$
$$y=0.5\text{--}0.75$$
$$z=0.1\text{--}0.3$$
$$a=0\text{--}0.2$$
$$b=0\text{--}0.15$$
$$c=0\text{--}0.55$$

The crystal structure of these ferrite ceramic compositions is of the same type as the mineral spinal $$Mg^{2+}Al_2^{3+}O_4$$

or magnetite $Fe^{3+}[Fe^{2+}Fe^{3+}]O_4$. The general formula given above may be considered to be obtained by substitution of cations in magnetite, such substitutions forming a series of solid solutions with magnetite.

To further illustrate the nature of the invention a comparison is made with the properties of a common commercial ferrite material 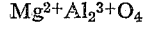 which has been subjected to low temperature firing treatment. A pressed sample was fired at 900° C. for 16 hours yielding a material with a coercive force of 50 oersteds and a $B_r/B_s$ of 0.1. When fired at 1050° for 16 hours the $H_c$ was 23 oersteds and $B_r/B_s$ was 0.2. These values of coercive force are too high and the $B_r/B_s$ ratios too low to be used as a memory or storage device. A material with high coercive force requires a correspondingly high energizing current in a nearby conductor to achieve switching and storage. Current generating devices preferably used in high speed computer mechanisms cannot generate these high energizing currents. The output signals which result upon switching a magnetic material cannot be detected when the $B_r/B_s$ ratio of the material is too low. The computer circuitry is unable to distinguish between the two stable magnetic remanent states.

A range of ferrite ceramic composition has been found which when subjected to low firing temperatures (800–1050° C.) thereafter exhibits magnetic properties which are desirable for purposes of storage and switching in computer mechanisms.

By virtue of the low firing temperature it becomes possible to prepare a composite device composed of a ferrite ceramic composition having bonded thereto in firing a copper containing metal conductor.

While the invention has been particularly shown and described with reference to preferred embodiments thereof, it will be understood by those skilled in the art that various changes in form and details may be made therein without departing from the spirit and scope of the invention.

What is claimed is:

1. A ferrite ceramic composition having the formula $$Fe_xCu_yNi_zTi_aCr_bZn_cO_4$$

wherein $$x+y+z+a+b+c=3$$
$$2.2 \leq x+y+z \leq 3.0$$
$$0 \leq a+b+c \leq 0.8$$

and $$x=1.5\text{--}2.1$$
$$y=0.5\text{--}0.75$$
$$z=0.1\text{--}0.3$$
$$a=0\text{--}0.2$$
$$b=0\text{--}0.15$$
$$c=0\text{--}0.55$$

prepared by mixing in finely divided form oxides of Fe, Cu, Ni, Ti, Cr, and Zn in proportions such that the ferrite ceramic composition produced by firing has the above formula; heating the thus formed mixture to a low firing temperature in the range from 800–1050° C. for a period of time from 6 minutes to 16 hours in an oxygen containing atmosphere and thereafter cooling.

2. A ferrite ceramic composition having the formula

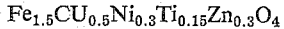

prepared for mixing in finely divided form oxides of Fe,

Cu, Nn, Ti and Zn in proportions such as the ferrite ceramic composition produced by firing has the above formula; heating the thus formed mixture to a temperature of 950° C. for 16 hours in an oxygen containing atmosphere and thereafter cooling.

3. A ferrite ceramic composition having the formula $$Fe_{2.1}Cu_{0.6}Ni_{0.3}O_4$$

prepared for mixing in finely divided form oxides of Fe, Cu and Ni in proportions such as the ferrite ceramic composition produced by firing has the above formula; heating the thus formed mixture to a temperature of 1050° C. for 16 hours in an oxygen containing atmosphere and thereafter cooling.

4. A ferrite ceramic composition having the formula $$Fe_{1.5}Cu_{0.5}Ni_{0.1}Ti_{0.2}Cr_{0.15}Zn_{0.55}O_4$$

prepared for mixing in finely divided form oxides of Fe, Cu, Ni, Ti, Cr, and Zn in proportions such as the ferrite ceramic composition produced by firing has the above formula; heating the thus formed mixture to a temperature of 950° C. for 6 minutes in an oxygen containing atmosphere and thereafter cooling.

5. A composite device composed of a ferrite ceramic composition having bonded thereto in firing a copper containing metal conductor, wherein said ferrite ceramic composition has the formula $$Fe_xCu_yNi_zTi_aCr_bZn_cO_4$$

wherein $x+y+z+a+b+c=3$
$2.2 \leq x+y+z \leq 3.0$
$0 \leq a+b+c \leq 0.8$
$x=1.5-2.1$
$y=0.5-0.75$
$z=0.1-0.3$
$a=0-0.2$
$b=0-0.15$
$c=0-0.55$ prepared by placing an initial intimate mixture of oxides containing Fe, Cu, Ni, Ti, Cr, and Zn in proportions such that the ferrite ceramic composition produced by firing has the above formula in contact with a copper containing metal conductor and firing the structure thus formed to a temperature in the range from 800–1050° C. for a period of time from six minutes to sixteen hours in an oxygen containing atmosphere and thereafter cooling.

6. A composite device according to claim 5 wherein the copper containing metal conductor is composed entirely of copper.

7. A composite device according to claim 5 wherein the copper containing metal conductor is composed of a copper-nickel alloy.

8. A composite device composed of a ferrite ceramic composition having bonded thereto in firing a copper containing metal conductor, wherein said ferrite ceramic composition has the formula $$Fe_{1.75}Cu_{0.5}Ni_{0.3}Ti_{0.15}Zn_{0.3}O_4$$

prepared by placing an initial intimate mixture of oxides containing Fe, Cu, Ni, Ti, and Zn in proportions such that the ferrite ceramic composition produced by firing has the above formula in contact with a copper containing metal conductor and firing the structure thus formed to a temperature of 950° C. for 16 hours in an oxygen containing atmosphere and thereafter cooling.

9. A composite device composed of a ferrite ceramic composition having bonded thereto in firing a copper containing metal conductor, wherein said ferrite ceramic composition has the formula:

$$Fe_{2.1}Cu_{0.6}Ni_{0.3}O_4$$

prepared by placing an initial mixture of oxides containing Fe, Cu, and Ni in proportions such that the ferrite ceramic composition produced by firing has the above formula in contact with a copper containing metal conductor and firing the structure thus formed to a temperature of 1050° C. for 16 hours in an oxygen containing atmosphere and thereafter cooling.

10. A composite device composed of a ferrite ceramic composition having bonded thereto in firing a copper containing metal conductor, wherein said ferrite ceramic composition has the formula:

$$Fe_{1.5}Cu_{0.5}Ni_{0.1}Ti_{0.2}Cr_{0.15}Zn_{0.55}O_4$$

prepared by placing an initial mixture of oxides containing Fe, Cu, Ni, Ti, Cr, and Zn in proportions such that the ferrite ceramic composition produced by firing has the above formula in contact with a copper containing metal conductor and firing the structure thus formed to a temperature 950° C. for 6 minutes in an oxygen containing atmosphere and thereafter cooling.

No references cited.